(12) United States Patent
Hillery et al.

(10) Patent No.: US 7,778,343 B2
(45) Date of Patent: Aug. 17, 2010

(54) METHOD AND APPARATUS FOR FINITE IMPULSE RESPONSE CYCLIC-SHIFT DIVERSITY

(75) Inventors: William J. Hillery, Hoffman Estates, IL (US); Thomas P. Krauss, Algonquin, IL (US); Bishwarup Mondal, Rolling Meadows, IL (US); Timothy A. Thomas, Palatine, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 874 days.

(21) Appl. No.: 11/627,563

(22) Filed: Jan. 26, 2007

(65) Prior Publication Data

US 2008/0181191 A1     Jul. 31, 2008

(51) Int. Cl.
    *H04B 7/02*     (2006.01)
    *H04L 1/02*     (2006.01)
(52) U.S. Cl. .................. 375/267; 375/260; 370/339
(58) Field of Classification Search .............. 375/260, 375/267; 370/339
See application file for complete search history.

(56) References Cited

U.S. PATENT DOCUMENTS 6,377,631 B1    4/2002    Raleigh 7,616,697 B2 *   11/2009   Spencer ...................... 375/265
2006/0028976 A1    2/2006   Park et al.
2006/0250944 A1   11/2006   Hong et al.

FOREIGN PATENT DOCUMENTS

KR    10-2005-0015738 A    2/2005
KR    10-2005-0021687 A    3/2005

OTHER PUBLICATIONS

Sung Don Moon, "PCT International Search Report and Written Opinion" Jun. 11, 2008.
J. Tan, G. L. Stüber, "Multicarrier Delay Diversity Modulation for MIMO Systems," IEEE Trans. on Wireless Comm., vol. 3, No. 5, Sep. 2004.
G. Montalbano, I. Ghauri, and D. Slock, "Spatio-Temporal Array Processing for CDMA/SDMA Downlink Transmission," Asilomar 98.

* cited by examiner

*Primary Examiner*—David C Payne
*Assistant Examiner*—Nader Bolourchi

(57) ABSTRACT

A generalized form of cyclic shift diversity is described for use in an OFDM system with multiple transmit antennas. Multiple cyclic shifts are performed for each transmit antenna and the shifted signals are scaled and summed to form a time-domain data stream for each transmit antenna. A cyclic extension is added to each data stream prior to transmission.

17 Claims, 10 Drawing Sheets

100
(prior-art)

300
(prior-art)

400

405

600

700

701

METHOD AND APPARATUS FOR FINITE IMPULSE RESPONSE CYCLIC-SHIFT DIVERSITY

FIELD OF THE INVENTION

The present invention relates generally to cyclic-shift transmit diversity and in particular, to a method and apparatus for performing finite impulse response cyclic-shift diversity in wireless communications.

BACKGROUND OF THE INVENTION

Antenna arrays are used for wireless transmission to provide enhanced data-rates or increased reliability of reception compared to single antenna transmission. There are a wide variety of transmission techniques that can be used with an array of antennas at a transmitter in a wireless system. One example is transmit beamforming (sometimes referred to as transmit adaptive array (TXAA) transmission). Transmit beamforming increases the effective signal-to-noise ratio seen by a receiver device by creating a coverage pattern that tends to be directional in nature (i.e., not uniformly broadcast). This is accomplished by weighting each antenna such that the combined transmissions result in a beamformed pattern having a maximum power in the direction of the receiver. Transmit beamforming can be deployed by a base station operating in cellular communication systems and generally requires some knowledge regarding the channel response between the antenna array and the intended receiver.

Despite the advantages of transmit beamforming, there are circumstances where it is desirable for a base station to transmit data without using transmit beamforming. For example, in wireless communication systems, a base station may transmit broadcast control information that is intended to be received by any subscriber device that happens to be in the coverage area of the base station. Such control information must in general be transmitted with a transmission pattern that is uniform over the coverage area of the base station. Other examples arise when the transmitted data is intended to be received by multiple users simultaneously, and consequently the transmission cannot be customized for any particular user. Another situation may occur when the information about the wireless channel available at the transmitter is not suitable for customizing the transmitted signals to a particular user, for example, a cellular communication system where the mobile receivers have high velocity and the transmitter base-station does not have up-to-date channel information for the mobiles. In cases where transmit beamforming is not appropriate, there are a variety of space-time-coding and transmit diversity techniques that can be employed by the transmitter, but these techniques generally require the receivers to be configured specially for the particular transmit technique.

When transmit beamforming is not appropriate, there exist situations where the transmitted data must appear indistinguishable from a single-antenna transmission to avoid the need for the receivers to be cognizant of the specific transmission scheme. In such scenarios, the base station can simply transmit with only one transmit antenna. If, however, Power Amplifiers (PA's) with a limited linear operating region are deployed behind the transmit antennas, the transmitter cannot simply increase the transmit power fed to one transmit antenna to match the total power that could have been transmitted had all the transmit antennas been exploited. As a result, transmitting with only one antenna would result in a significant loss in transmit power (⅞ of the power is lost with 8 transmit antennas, ¾ of the power is lost for 4 transmit antennas, etc.). Moreover, the spatial diversity of the transmit antenna array is lost with single-antenna transmission. On the other hand, sending the same waveform to all transmit antennas causes the effective transmit antenna pattern to have nulls in various fixed locations in the coverage area, which is unacceptable for transmissions requiring a uniform coverage pattern.

In such situations where a transmit antenna array must provide a uniform coverage pattern while transmitting from all antennas, delay diversity or cyclic-delay diversity is a viable transmission method. In particular, an orthogonal frequency division multiplexing (OFDM)-based system may employ cyclic shift diversity (CSD) to provide a transmit array pattern that avoids spatial nulls and may be broadcast in nature while not requiring the receivers to be explicitly aware of (or configured for) CSD.

In a multi-carrier communication system such as OFDM, CSD may be applied at the transmitter by first calculating the inverse fast Fourier transform (IFFT) of the frequency domain signal. The signal transmitted by each antenna may then be created by performing a circular shift of the resulting signal by an integer multiple of a basic integer shift and then adding the cyclic prefix. While the effective transmit antenna pattern no longer has spatial nulls, the effective channel seen by a receiver may unfortunately contain nulls in the frequency domain due to the application of CSD. While CSD will produce a performance gain relative to a single antenna transmission in many cases, in certain channels there will be a performance loss due to the presence of the frequency response nulls created by the application of CSD. Such channels include those that are strongly Rician. Therefore, there is a need for a method and apparatus which provides the advantages of CSD, but which mitigates the performance loss in certain channels.

DETAILED DESCRIPTION OF THE DRAWINGS

Figure 1:
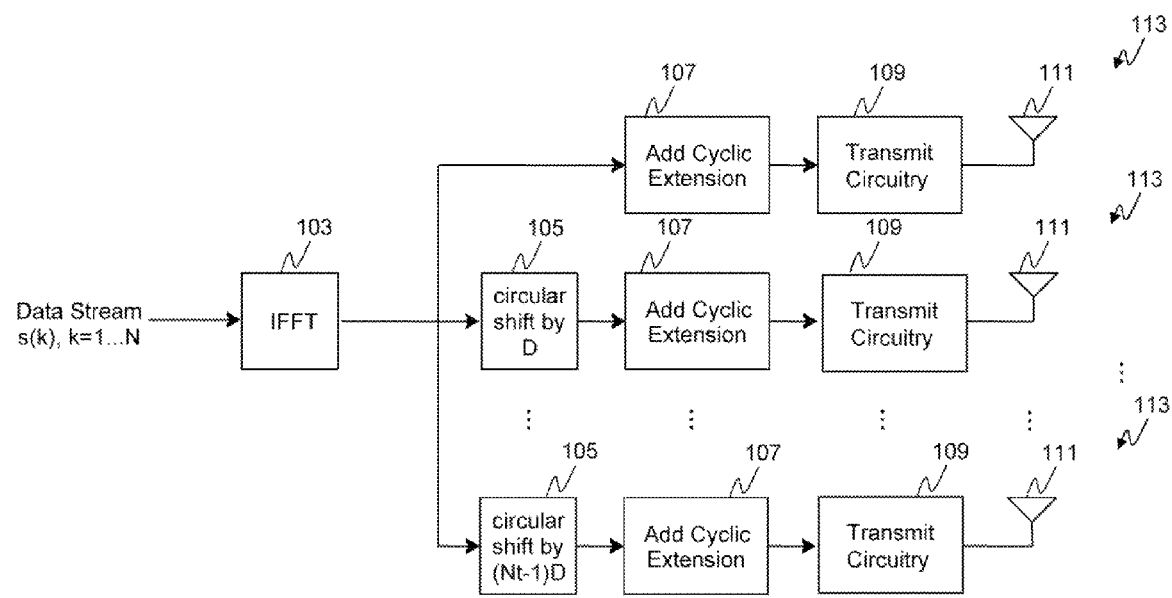
FIG. 1 is a block diagram of a transmitter using prior-art cyclic shift diversity (CSD).

In order to address the above-mentioned need, finite impulse response (FIR) based CSD (FIR-CSD) is provided as a generalization of CSD which can mitigate the performance loss seen with CSD for certain channels. For systems such as those based on the IEEE 802.16e standard, FIR-CSD transmission can be configured to be indistinguishable from a single antenna transmission, thereby maintaining standards compliance. However, in general, the FIR-CSD transmission does not necessarily have to be transparent as long as the receiver knows how the transmitter implemented FIR-CSD.

In order to simplify the description of FIR-CSD, an orthogonal frequency division multiplexing (OFDM) system will be assumed even though FIR-CSD is applicable to other multicarrier modulation methods (such as spread-OFDM, cyclic prefix code division multiple access (CDMA), interleaved frequency division multiple access, and the like) and even regular single-carrier type modulations (such as CDMA, single carrier modulation, cyclic-prefix single carrier, and the like). Also to simplify the following it will be assumed that circular shifts of the time domain data are employed. It is, however, understood that an alternative to circular shifts are regular delays or shifts (i.e., time delaying which is also known as delay diversity) which may have to be used in non-cyclic prefix communications such as the aforementioned single-carrier type modulations.

During operation, for each transmit antenna element in an OFDM system, FIR-CSD shifts an IFFT output (i.e., a time-domain OFDM signal or time-domain data stream) by a plurality of circular shifts. The result of each circular shift is scaled (multiplied) by a complex gain and the shifted and scaled signals are added together to form an intermediate signal. A cyclic prefix is added to the intermediate signal to create the signal transmitted by the antenna element. A similar process is performed for each of the remaining transmit antennas, although it should be noted that one or more of the antenna branches may not have any shifts or multiplications performed. Moreover, one or more antenna branches may employ shifts without any scaling/multiplication of the shifted signals.

The effective channel seen by a system receiving an FIR-CSD signal is modified by the shift-scale-sum operations of FIR-CSD. In a strongly Rician channel, for example, the receiver will see approximately the sum of the signals from each transmit antenna. In a standard CSD system, the effective channel has nulls in the frequency domain. FIR-CSD allows the system designer to choose shifts and scaling factors which can reduce the depth of the nulls and make the effective frequency domain channel response flatter. At the same time, the parameters can be chosen to maintain much of the diversity which yields a performance gain over using a single transmit antenna. Thus, FIR-CSD can reduce the performance loss of CSD in certain channels while maintaining much of the performance gain of CSD in other channels.

The present invention encompasses a method for transmitting data. The method comprises the steps of receiving data on a first antenna path, shifting the data by a first amount on the first antenna path to produce first shifted data, and shifting the data by a second amount on the first antenna path to produce second shifted data. The first shifted data and the second shifted data are combined to produce first combined data and then the combined data is transmitted on a first antenna.

The present invention additionally encompasses a method for transmitting data. The method comprises the steps of receiving data on a first antenna path shifting the data by a first amount on the first antenna path to produce first shifted data, and scaling the first shifted data by a first scaling amount to produce first shifted and scaled data. The data is shifted by a second amount on the first antenna path to produce second shifted data, and the second shifted data is scaled by a second scaling amount to produce second shifted and scaled data. The first shifted and scaled data and the second shifted and scaled data are combined to produce first combined data and the first combined data is transmitted on a first antenna.

The present invention additionally encompasses an apparatus comprising a first antenna path receiving data. The first antenna path comprises a shift processor shifting the data by a first amount to produce first shifted data, the shift processor also shifting the data by a second amount to produce second shifted data, the shift processor also combining the first shifted data and the second shifted data to produce first combined data. The apparatus additionally comprises transmitting circuitry transmitting the combined data on a first antenna.

Figure 2:
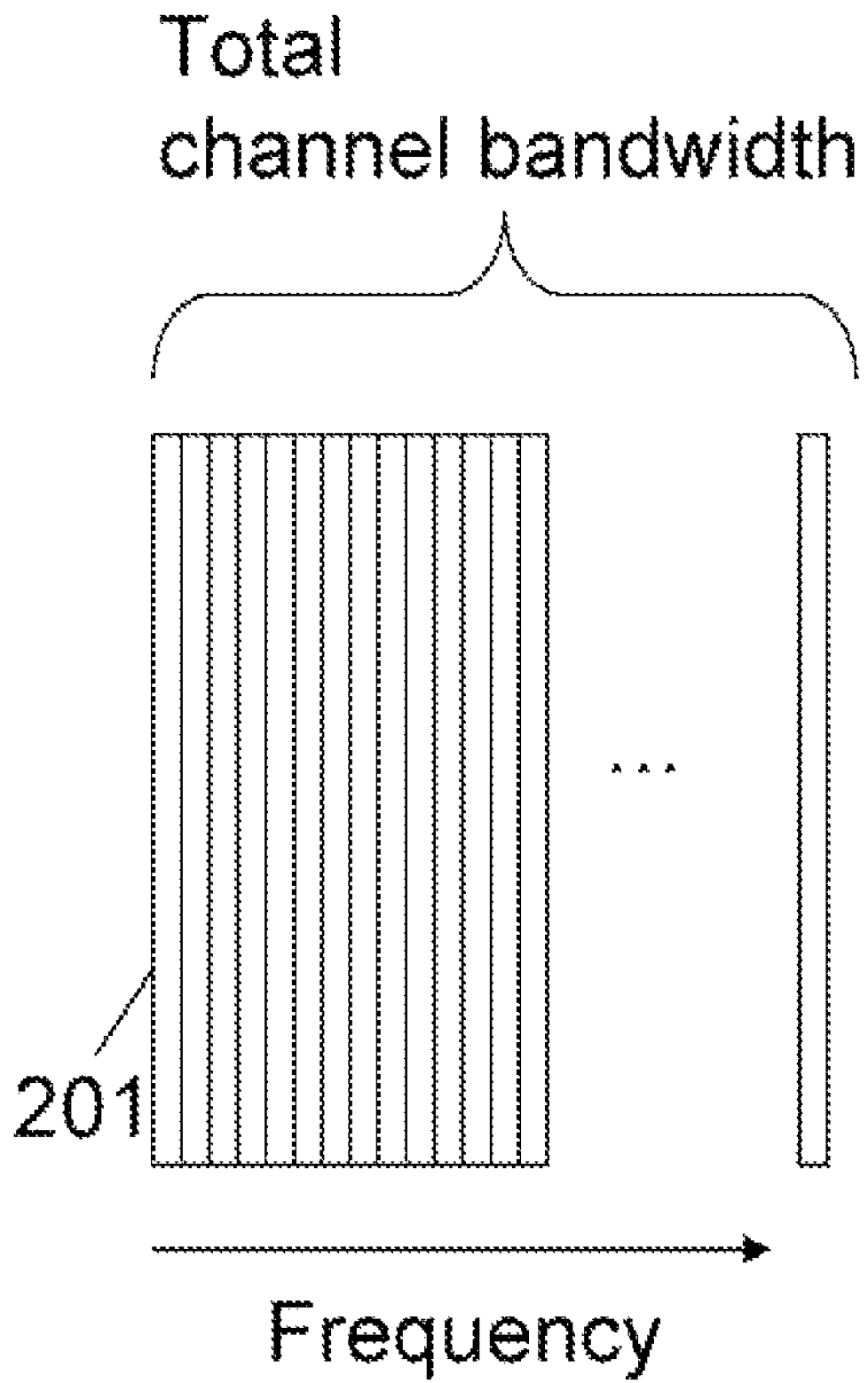
FIG. 2 illustrates multicarrier transmission.

Turning now to the drawings, wherein like numerals designate like components, FIG. 1 is a block diagram of a prior-art transmitter 100 for performing standard CSD on an input (frequency-domain) data stream. Transmitter 100 utilizes an OFDM or multicarrier based architecture. As one of ordinary skill in the art will recognize, during operation of an OFDM system, multiple subcarriers (e.g., 768 subcarriers) are utilized to transmit wideband data. This is illustrated in FIG. 2. As shown in FIG. 2 the wideband channel is divided into many narrow frequency bands (subcarriers) 201, with data being transmitted in parallel on subcarriers 201. As is customary in OFDM, each input to an IFFT corresponds to a subcarrier in the frequency domain. Therefore, a signal that is intended to be transmitted on a given subcarrier is fed to an IFFT input that corresponds to that subcarrier.

Transmitter 100 comprises inverse Fast Fourier Transform (IFFT) circuitry 103, circular-shift circuitry 105, cyclic extension circuitry 107 and transmit circuitry 109. During operation, a data stream s(k), k=1, 2, . . . , N enters IFFT circuitry 103 (where N is the number of occupied subcarriers). IFFT circuitry 103 performs an inverse Fast Fourier Transform on the data stream, converting the frequency-domain data stream into a time-domain data stream of length K, where K is the length of the Fast Fourier Transform (FFT) and $K \geq N$. For all but one of the Nt transmit antennas, the time-domain data stream enters circular shift circuitry 105. Circular shift circuitry 105 performs a circular shift of the K time domain signal samples by an integer multiple of a first shift D time-domain samples. The circular shifts on the Nt−1 antennas use the circular shifts D, 2D, . . . , (Nt−1)D. The un-shifted data stream and the Nt−1 shifted data streams each enter cyclic extension circuitry 107, which adds a cyclic extension to the data stream. Each extended data stream is transmitted by transmit circuitry 109 and antennas 111.

Figure 3:
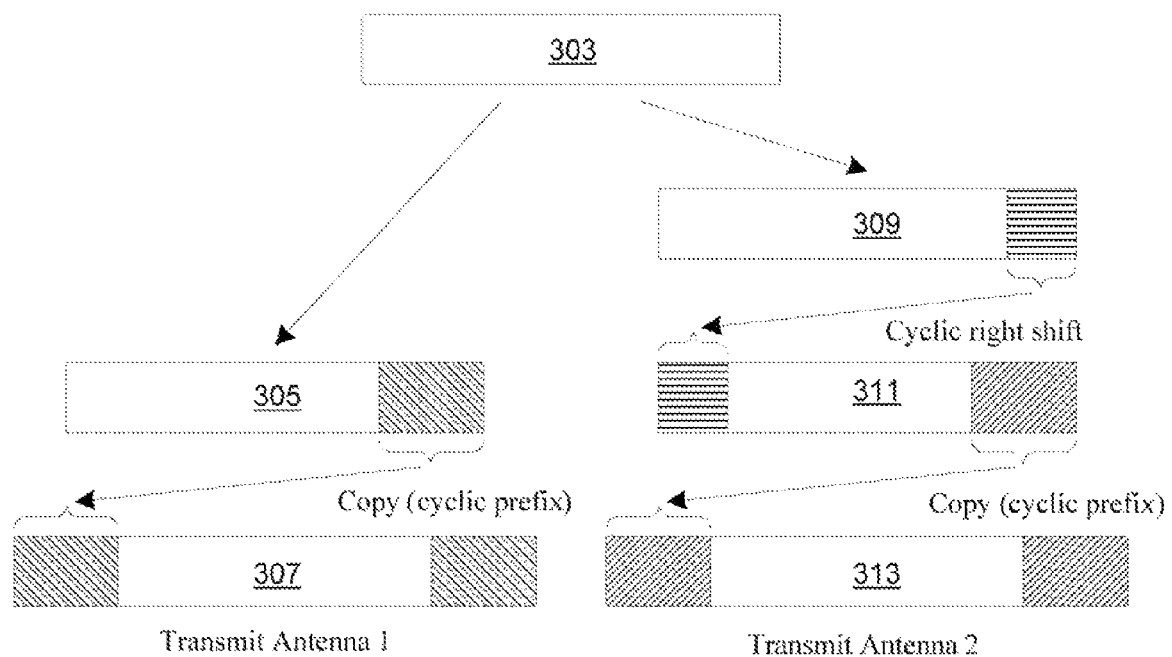
FIG. 3 illustrates prior-art transmission using the transmitter of FIG. 1.

The prior-art process for creating the transmitted data streams in transmitter 100 is illustrated in FIG. 3 for a system with two transmit antennas (Nt=2). For transmit antenna 1, time domain data stream 303 becomes time-domain data stream 305. A cyclic extension is added to time-domain data stream 305 by copying samples from the end of data stream 305 (the shaded portion) and adding them to the beginning of data stream 305 to create data stream 307. Data stream 307 enters transmit circuitry 109 for the first transmit antenna element. For transmit antenna 2, time domain data stream 303 becomes time-domain data stream 309. Data stream 309 is shifted to the right by circular shift D. The shifted sequence is time-domain data stream 311. A cyclic extension is added to time-domain data stream 311 by copying samples from the end of data stream 311 (the diagonally shaded portion) and adding them to the beginning of data stream 311 to create data stream 313. Data stream 313 enters transmit circuitry 109 for the second transmit antenna element.

As discussed above, while the prior-art system described above will produce a performance gain relative to a single antenna transmission in many cases, in certain channels there will be a performance loss due to the presence of frequency domain nulls created by the application of CSD. In order to address this drawback, FIR-CSD may be employed by transmitters. More particularly, FIR-CSD shifts an IFFT output by a plurality of circular shifts. The result (for each antenna path) is that multiple copies of the data exist, each having a different circular shift amount. Each copy of the data is multiplied by a complex gain and the shifted and scaled signals are then added together to form an intermediate signal. A cyclic prefix (which is one form of cyclic extension) is added to the intermediate signal to create the signal transmitted by the antenna element. This signal is then transmitted over an antenna. Note that a cyclic prefix is used only as an example and other forms of cyclic extensions can be used such as a cyclic postfix, a split prefix/postfix, or the like.

Figure 4:
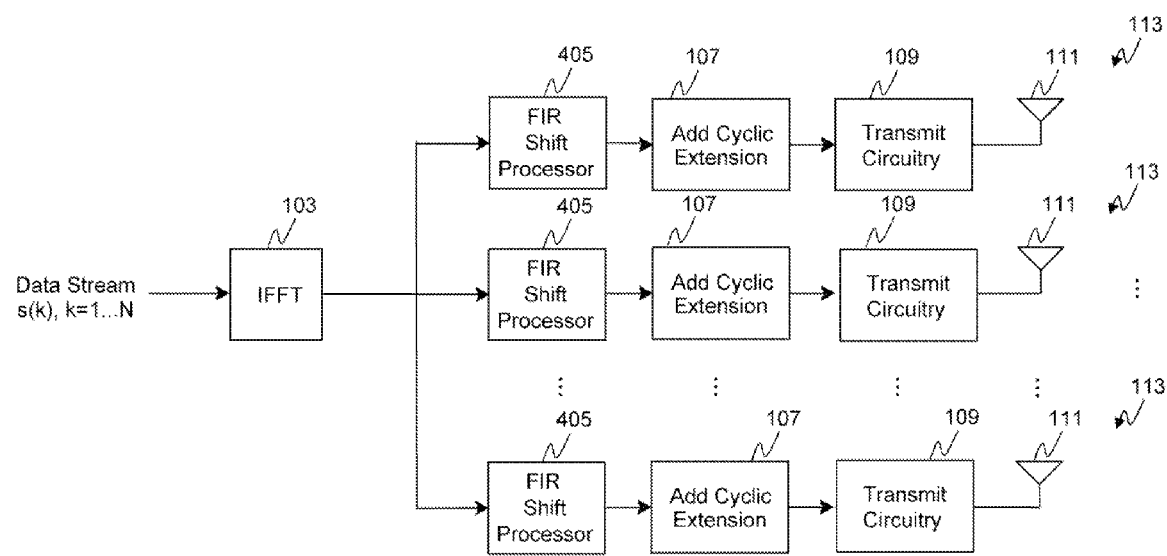
FIG. 4 is a block diagram of an embodiment of a transmitter for performing finite impulse response CSD (FIR-CSD).

FIG. 4 is a block diagram of transmitter 400 which illustrates a particular embodiment for performing FIR-CSD. Transmitter 400 also utilizes an OFDM or multicarrier based architecture (FIG. 2). Transmitter 400 comprises IFFT circuitry 103, FIR shift processing circuitry 405, cyclic extension circuitry 107 and transmit circuitry 109. Transmitter 400 additionally comprises multiple antenna paths. During operation, a data stream s(k), k=1, 2, ..., N enters IFFT circuitry 103 (where N is the number of occupied subcarriers). IFFT circuitry 103 performs an IFFT on the data stream, converting the frequency-domain data stream into a time-domain data stream of length K. For each of the Nt transmit antennas, the time-domain data stream enters FIR shift processing circuitry 405 where the FIR shift processing circuitry 405 is potentially unique for each transmit antenna in terms of the number of shifts, the shift values, and the scaling factors (if any) that are applied by the shift processing circuitry. FIR shift processing circuitry 405 creates the FIR-CSD data stream for a single transmit antenna. FIR shift processing circuitry 405 serves to receive data and cyclically shift the data by a first amount to produce first cyclically shifted data. The first cyclically shifted data is scaled by a first scaling amount to produce first cyclically shifted and scaled data. (In some embodiments, this first scaling may be omitted or equivalently the scaling amount may effectively be a value of one.) As discussed above, the data received will be cyclically shifted by a second amount to produce second cyclically shifted data. The second cyclically shifted data will be scaled by a second scaling amount to produce second cyclically shifted and scaled data. (Similarly, in some embodiments this second scaling amount may be omitted or equivalently the scaling amount may effectively be a value of one.) Finally, the first cyclically shifted and scaled data and the second cyclically shifted and scaled data are combined and output to cyclic extension circuitry 107 as a FIR-CSD data stream. The FIR-CSD data stream enters cyclic extension circuitry 107, which adds a cyclic extension to the data stream. Each extended data stream is transmitted by transmit circuitry 109 and antennas 111. Note that FIG. 4 is just one example of how FIR-CSD may be implemented. An alternative embodiment implements FIR-CSD in the frequency domain as described below. Other embodiments of FIR-CSD replace the cyclic shifts with regular delays (or shifts). Still other embodiments of FIR-CSD may not add cyclic extensions before transmission.

Figure 5:
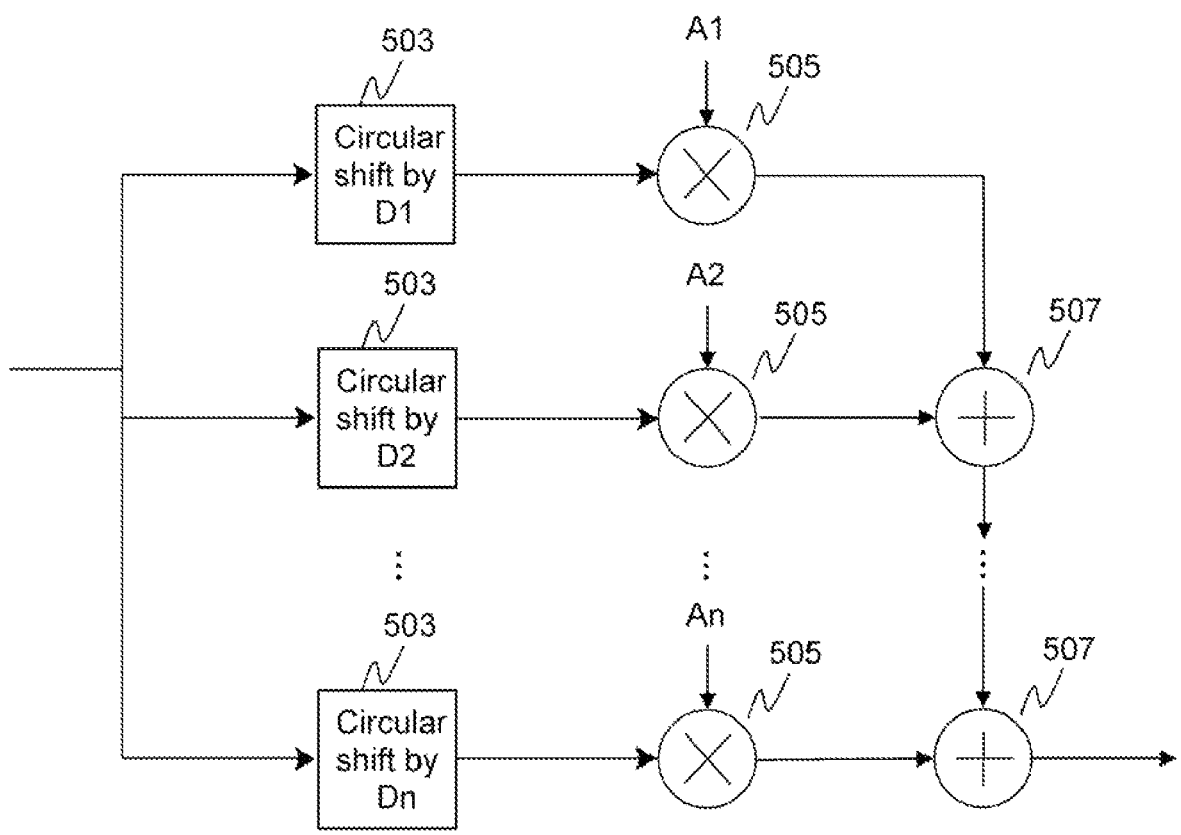
FIG. 5 is a block diagram of the FIR shift processor of FIG. 4.

FIG. 5 is a block diagram of FIR shift processor 405. The time domain data stream from IFFT circuitry 103 enters FIR shift processor 405 where it is fed to a plurality of circular shift units 503. Circular shift units 503 shift the time-domain data stream by a plurality of circular shifts D1, D2, ..., Dn. Note that the number of circular shifts n may be different in each instance of FIR shift processor 405 (i.e., may be different for each transmit antenna). In addition, shift sizes D1, D2, ..., Dn may be different in each instance of FIR shift processor 405 (i.e., may be different for each transmit antenna). For some antennas, there may be only a single shift. In addition, one of the shifts may be zero. The shifted time-domain data streams are scaled by a complex scaling factors A1, A2, ..., An by complex multipliers 505. Note that the complex scaling factors A1, A2, ... An may be different in each instance of FIR shift processor 405 (i.e., may be different for each transmit antenna). Also note that one or more of the complex scale factors may be omitted in some embodiments, or equivalently one or more of the scaling factors A1, A2, ..., An may be set to unity. The scaled and shifted time-domain data streams are combined into a single time-domain data stream by complex adders 507 to create the FIR-CSD data stream.

Figure 6:
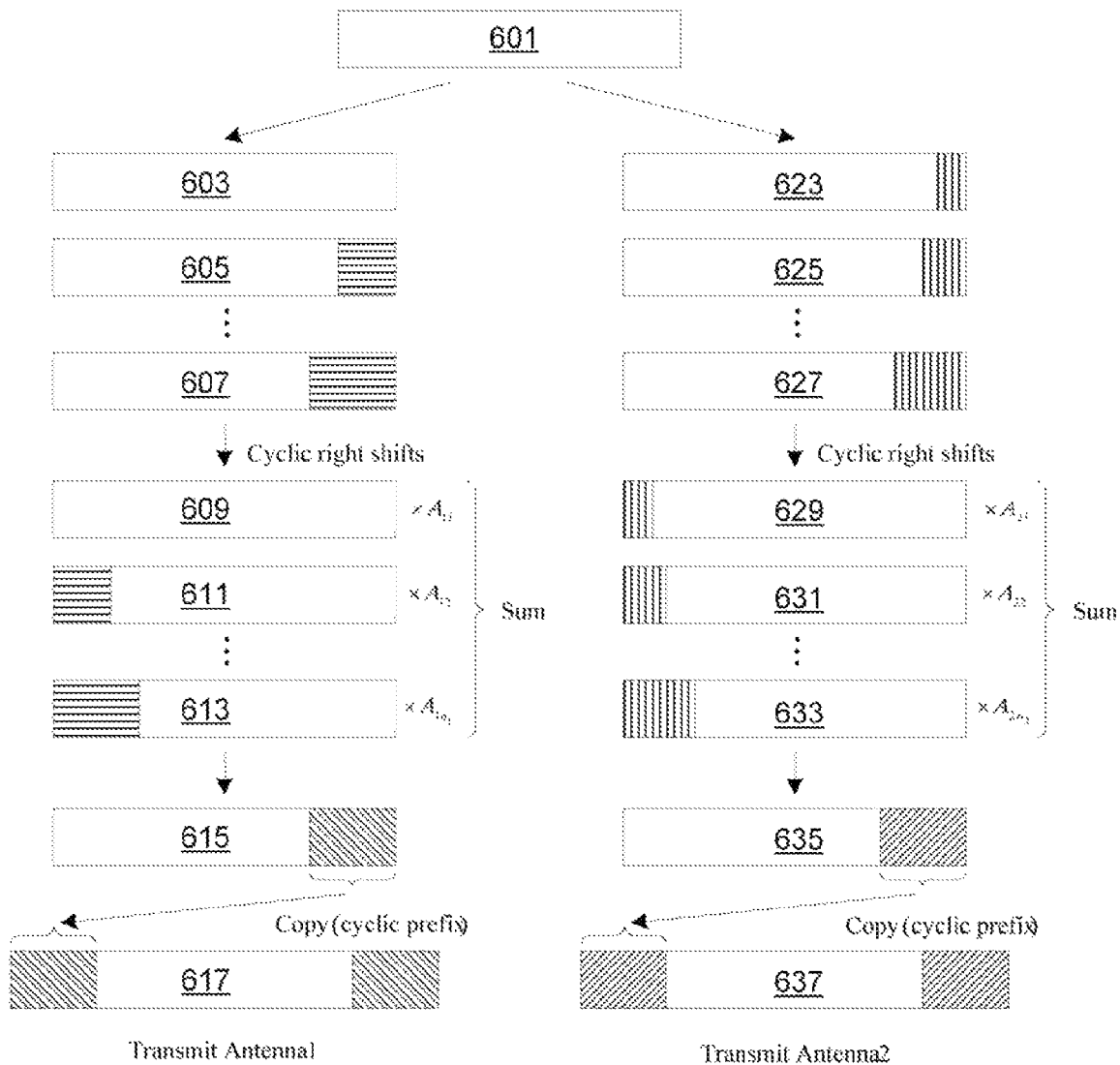
FIG. 6 illustrates the process for creating the FIR-CSD data stream from the time-domain data stream for a system with two transmit antennas.

The process for creating the FIR-CSD data stream from the time-domain data stream is illustrated in FIG. 6 for a system with two transmit antennas (Nt=2). The input to the FIR shift processors for each antenna is the time-domain data stream 601. For the first transmit antenna, the time domain samples to be shifted to the right in a circular fashion are shown as the shaded portions of time-domain data streams 603, 605, and 607. Time-domain data streams 603, 605, and 607 are identical to data stream 601 and are shown for illustrative purposes only. In the figure, the shift on first data stream 603 has been assumed to be zero. The results after shifting time-domain data streams 603, 605, and 607 are respectively shown as time domain data streams 609, 611, and 613. Time domain data streams 609, 611, and 613 are scaled by the complex coefficients $A_{kl}$, where k is the antenna number and l=1, 2, ..., $n_1$ is the stream number, and there are $n_1$ shift and scale operations performed for the first antenna. The $n_1$ shifted and scaled data streams are added to form data stream 615. Data stream 615 is the output of FIR shift processor 405 for the first transmit antenna. A cyclic extension is added to data stream 615 by cyclic extension circuitry 107 by copying samples from the end of data stream 615 (the diagonally shaded portion) and appending them to the beginning of data stream 615 to create data stream 617. Data stream 617 enters transmit circuitry 109 for the first transmit antenna element.

For the second transmit antenna, the time domain samples to be shifted to the right in a circular fashion are shown as the shaded portions of time-domain data streams 623, 625, and 627. Time-domain data streams 623, 625, and 627 are identical to data stream 601 and are shown for illustrative purposes only. The results after shifting time-domain data streams 623, 625, and 627 are respectively shown as time domain data streams 629, 631, and 633. Time domain data streams 629, 631, and 633 are scaled by the complex coefficients $A_{kl}$, where k is the antenna number and l=1, 2, ..., $n_2$ is the stream number, and there are $n_2$ shift and scale operations performed for the second antenna. The $n_2$ shifted and scaled data streams are added to form data stream 635. Data stream 635 is the output of FIR shift processor 405 for the second transmit antenna. A cyclic extension is added to data stream 635 by cyclic extension circuitry 107 by copying samples from the end of data stream 635 (the diagonally shaded portion) and appending them to the beginning of data stream 635 to create data stream 637. Data stream 637 enters transmit circuitry 109 for the second transmit antenna element.

While the invention has been illustrated as performing various operations in the time-domain, it is also possible to implement the invention in the frequency domain. A frequency-domain implementation of the invention is illustrated in FIG. 7 and FIG. 8.

Figure 7:
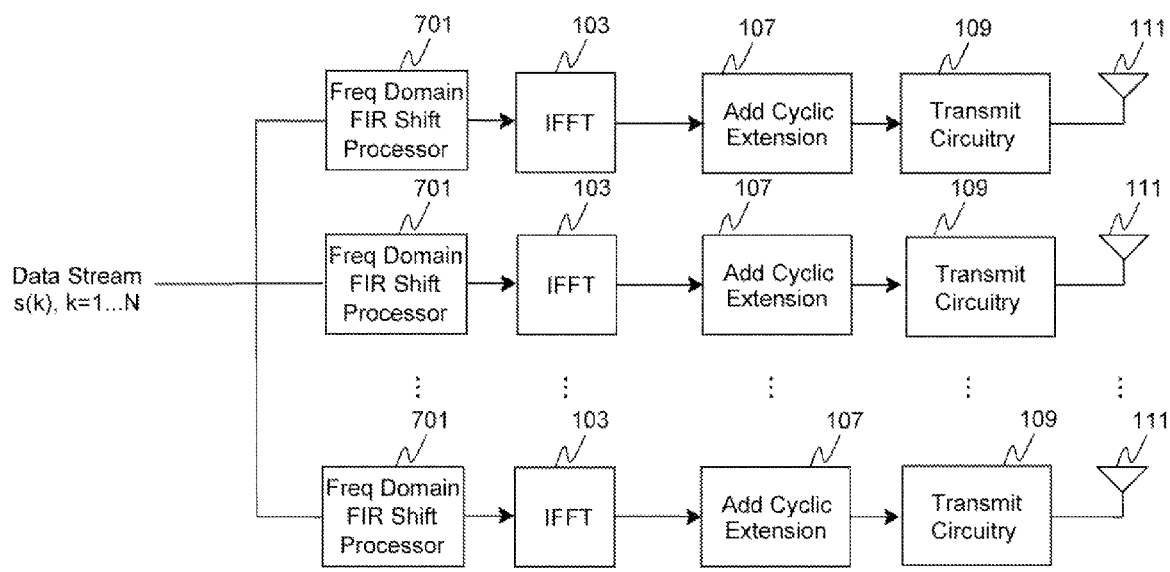
FIG. 7 is a block diagram of a transmitter which illustrates an embodiment of the present invention implemented in the frequency domain.

FIG. 7 is a block diagram of transmitter 700 which illustrates an embodiment of the present invention implemented in the frequency domain. Transmitter 700 comprises frequency domain FIR shift processor 701, IFFT circuitry 103, cyclic extension circuitry 107, and transmit circuitry 109. For each of the Nt transmit antennas, a frequency domain data stream s(k), k=1, 2, . . . , N enters frequency domain FIR shift processor 701. Frequency domain FIR shift processor 701 creates the frequency domain FIR-CSD data stream for a single transmit antenna by performing in the frequency domain an operation equivalent to the time domain operation in the FIR shift processor 405 for the corresponding transmit antenna. The frequency-domain FIR-CSD data stream enters IFFT circuitry 103. IFFT circuitry 103 performs an inverse Fast Fourier Transform on the data stream to create the time-domain FIR-CSD data stream. The time-domain FIR-CSD data stream enters cyclic extension circuitry 107, which adds a cyclic extension to the data stream. Each extended data stream is transmitted by transmit circuitry 109 and antennas 111.

Figure 8:
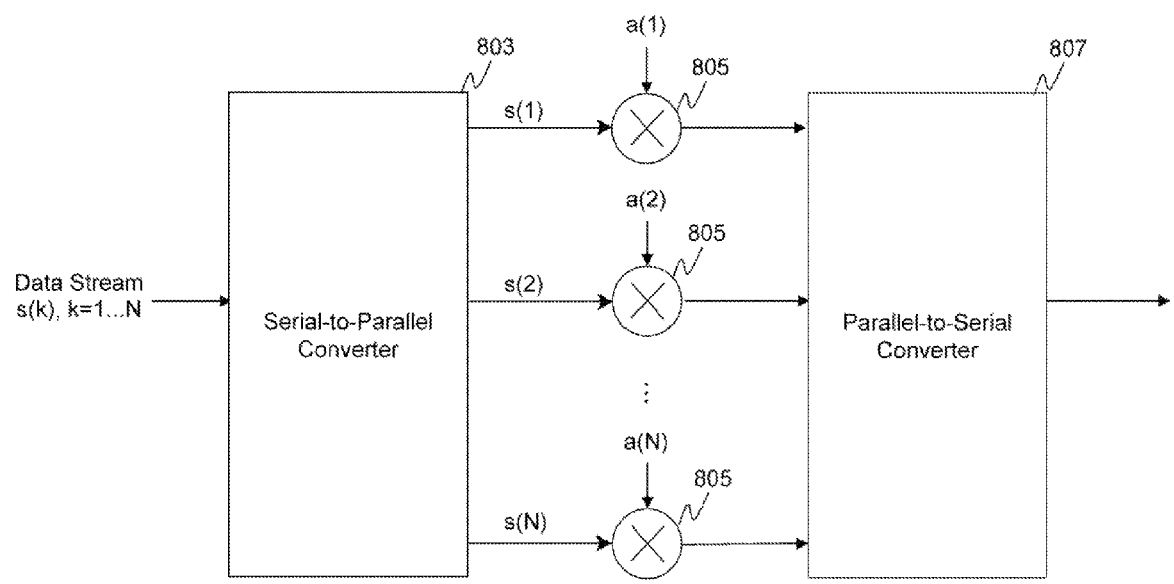
FIG. 8 is a block diagram of the frequency domain FIR shift processor of FIG. 7.

FIG. 8 is a block diagram of the frequency-domain FIR shift processor 701. The frequency-domain data stream s(k), k=1, 2, . . . , N enters serial-to-parallel converter 803 which produces the N individual elements of the data stream. Element s(k) (i.e., the frequency-domain data on subcarrier k) of the data stream is scaled by the complex number a(k) (also known as a FIR-CSD complex number) by complex multiplier 805 for k=1, 2, . . . , N (i.e., a plurality of subcarriers) thus producing scaled frequency-domain data. The set {a(1) through a(N)} contains the set of complex numbers on the antenna path that will scale the frequency domain data on the plurality of subcarriers. When the equivalent time domain FIR-CSD processor uses n cyclic shifts $D_1, D_2, \ldots, D_n$ and complex scaling factors $A_1, A_2, \ldots, A_n$, the complex scaling factors (i.e., the FIR-CSD complex numbers) for the frequency-domain FIR shift processor are $$a(k+M) = \sum_{m=1}^{n} A_m e^{-j2\pi k D_m / K},$$

where $j=\sqrt{-1}$, K is the length of the Fast Fourier Transform, and M is the index of the element of data stream s(k) on the subcarrier at zero frequency (DC). The scaled data stream elements enter parallel-to-serial converter 807 which produces the frequency-domain FIR-CSD data stream. The frequency-domain FIR-CSD data stream would then be sent to the IFFT circuitry 103 which will output a time-domain FIR-CSD data stream. The time-domain FIR-CSD data stream will look the same as the time-domain implementation of FIR-CSD using the FIR shift processor 405.

It should be noted that the equation for a(k+M) above gives a mathematical description of the FIR-CSD process at the transmitter for either the time-domain or frequency-domain versions of FIR-CSD. The importance of this observation is that it is possible to mix transmit beamforming on some subcarriers with FIR-CSD on other subcarriers. For example in the time-domain implementation of FIR-CSD, each transmit antenna will have a different a(k), which will be referred to as $a_l(k)$ where l refers to a specific transmit antenna (l= 1, . . . , Nt). Say transmit beamforming with weights $\beta_1$ through $\beta_{Nt}$ (respectively for transmit antennas 1 through Nt) are desired to be used on subcarrier k. Then in the time-domain version of FIR-CSD the frequency-domain data on subcarrier k, s(k), can be multiplied by $\beta_l/a_l(k)$ on subcarrier k on each antenna branch (l=1, . . . , Nt) before the IFFT 103 and before the FIR shift processor 405. In this way the data on subcarrier k is beamformed in the traditional sense and will not have FIR-CSD applied whereas the remaining subcarriers will have FIR-CSD applied. Note that a similar process can be defined for the frequency-domain version of FIR-CSD. In the frequency-domain version, the $a_l(k)$ on a given subcarrier for antenna l is simply replaced by $\beta_l$.

Figure 9:
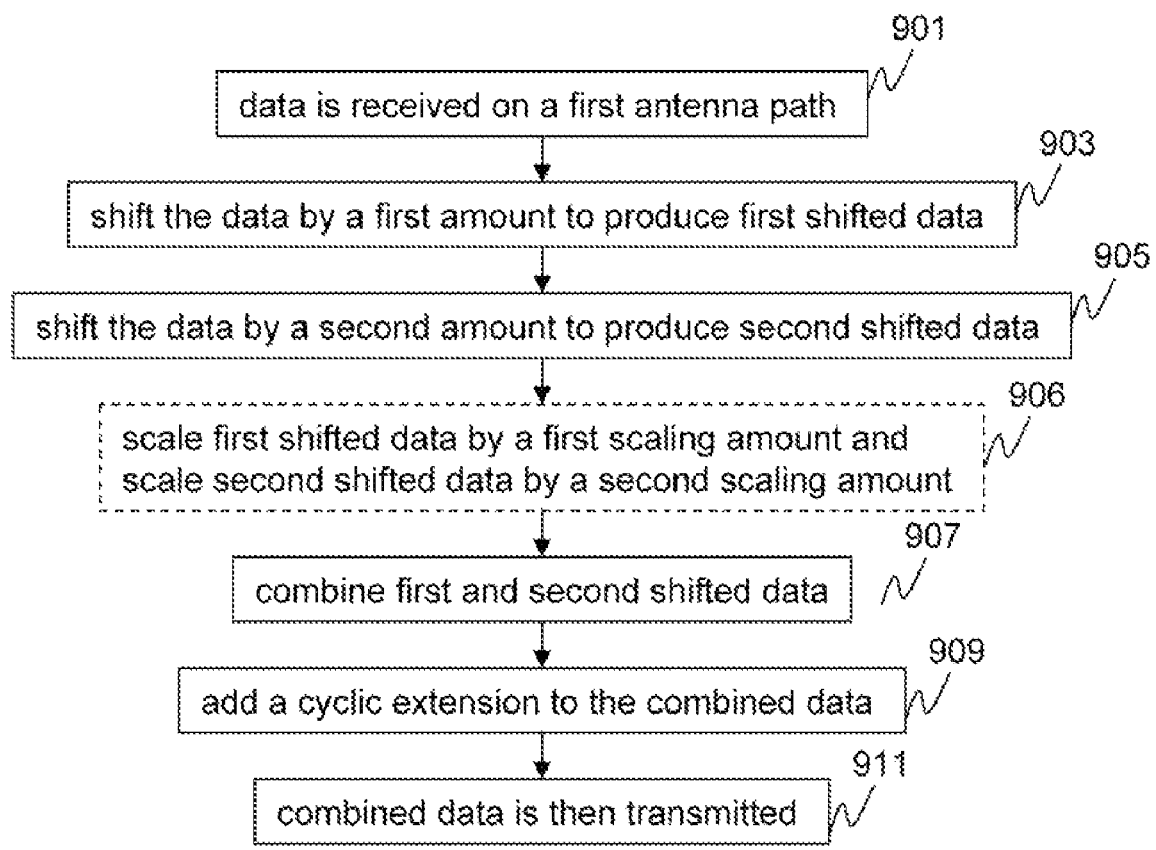
FIG. 9 is a flow chart showing operation of the transmitter of FIG. 4.

FIG. 9 is a flow chart showing operation of the transmitter of FIG. 4. For simplicity, the following logic flow shows those steps that take place on a single antenna path 113. Each antenna path would preferably follow those steps shown in FIG. 9, although the shift amounts and scaling amounts may be different for each antenna path as discussed below.

The logic flow begins at step 901 where data is received on a first antenna path. As discussed above, in one embodiment of the present invention, the data comprises time-domain OFDM data. At step 903 FIR shift processor 405 shifts the data by a first amount to produce first shifted data. At step 905 FIR shift processor 405 shifts the data by a second amount to produce second shifted data. In an embodiment of the present invention the shifts comprise cyclic shifts, however, as mentioned above, in other embodiments other forms of shifting may occur (e.g., time delaying). The first and the second shifted data are combined by FIR shift processor 405 (step 907) and cyclic extension circuitry adds a cyclic extension to the combined data (step 909). The resulting combined data is then transmitted via transmit circuitry 109 (step 911).

As discussed above, each shifted data may be individually scaled. In other words, the first shifted data would be scaled by a first scaling amount to produce first shifted and scaled data and the second shifted data would be scaled by a second scaling amount to produce second shifted and scaled data. This optional process may take place via FIR shift processor 405 and would take place at step 906 such that the step of combining the data at step 907 comprises the step of combining first shifted and scaled data and the second shifted and scaled data to produce the first combined data.

As discussed above, logic flow in FIG. 9 shows those steps that take place on a single antenna path 113. Each antenna path would preferably follow those steps shown in FIG. 9. Therefore, the transmitter 400 would also comprise a second FIR shift processor 405 receiving the data on a second antenna path 113. The second FIR shift processor 405 would shift the data by a third amount to produce third shifted data. Shift processor 405 would also shift the data by a fourth amount to produce fourth shifted data and combine the third shifted data and the fourth shifted data to produce second combined data. The second combined data would be transmitted via transmission circuitry.

It should be noted that if scaling is to be performed, the third shifted and the fourth shifted data will be scaled by a third and a fourth scaling amount. The step of combining the third shifted data and the fourth shifted data would then comprise the step of combining the third shifted and scaled data and the fourth shifted and scaled data to produce the second combined data.

Figure 10:
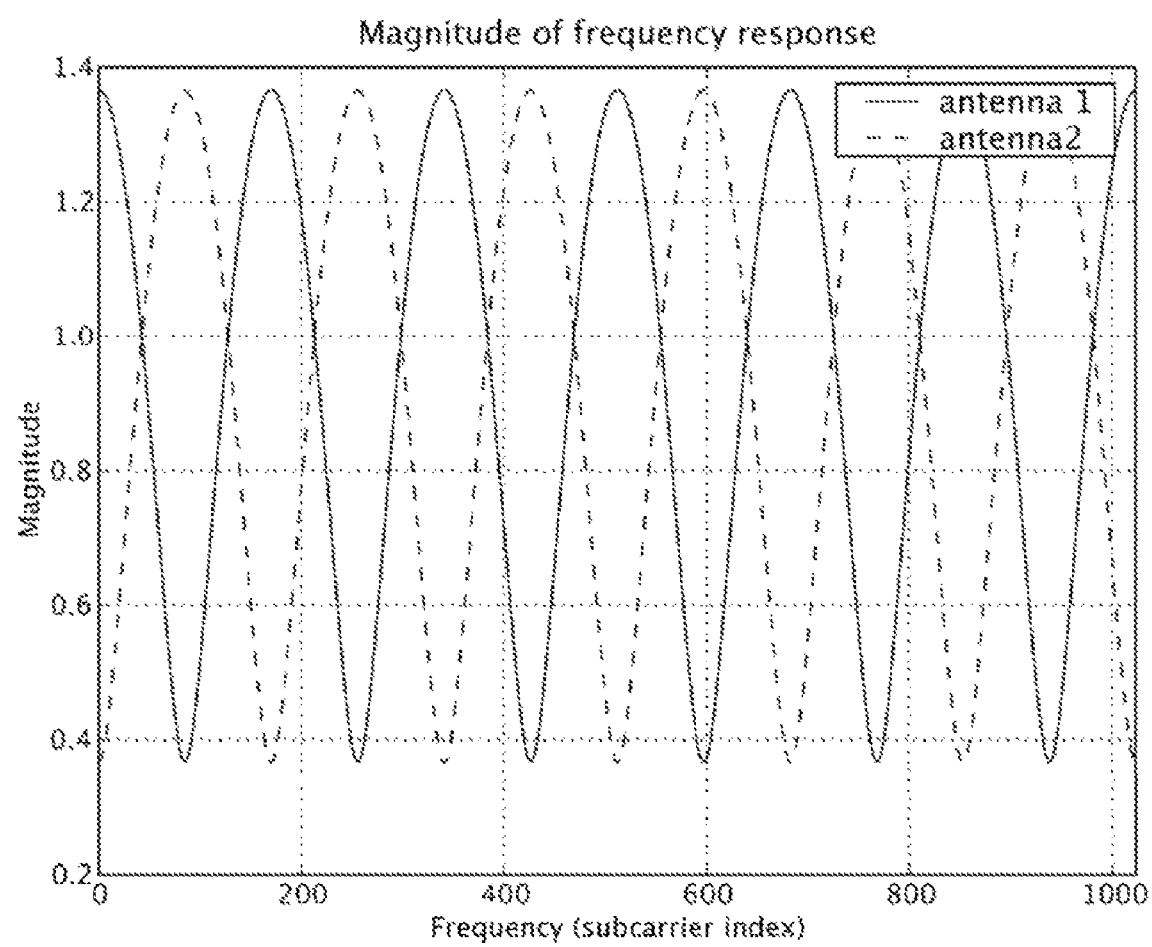
FIG. 10 illustrates the frequency selectivity of FIR-CSD on two transmit antennas chosen with complementary weights.

While the invention has been particularly shown and described with reference to a particular embodiment, it will be understood by those skilled in the art that various changes in form and details may be made therein without departing from the spirit and scope of the invention. For example, the above-described techniques introduce a frequency selectivity in the transmit signal for each of the antennas for which there are multiple shifts. This frequency selectivity results in an increased transmitted power on certain subcarriers and a decreased transmitted power on other subcarriers. To counteract the frequency selectivity from any one antenna, the circular shifts and complex scaling factors (the "filters") on each of the antennas may be chosen to complement each other, resulting in complementary filters. The total transmitted power of the complementary filters, which is the sum of the frequency selective transmitted powers of the different antennas, is constant with respect to frequency, that is, frequency non-selective (or approximately so). For example, with two antennas, FIG. 10 illustrates complementary filters. Here the shifts on the first antenna are 0 and 6, with complex scaling factors of 0.866 and 0.5; the shifts on the second antenna are 7 and 13, with complex scaling factors of 0.866 and −0.5. It is intended that such changes come within the scope of the following claims.

The invention claimed is:

1. A method for transmitting data, the method comprising the steps of:
receiving data on a first antenna path;
shifting the data by a first amount on the first antenna path to produce first shifted data;
scaling the first shifted data by a first scaling amount to produce first shifted and scaled data;
shifting the data by a second amount on the first antenna path to produce second shifted data;
combining the first shifted and scaled data and the second shifted data to produce first combined data; and
transmitting the combined data on a first antenna;
wherein the step of shifting the data by the first amount comprises the step of cyclically shifting the data by the first amount to produce first cyclically shifted data and wherein the step of shifting the data by the second amount comprises the step of cyclically shifting the data by the second amount to produce second cyclically shifted data.

2. The method of claim 1 further comprising the steps of:
receiving the data on a second antenna path;
shifting the data by a third amount on the second antenna path to produce third shifted data;
shifting the data by a fourth amount on the second antenna path to produce fourth shifted data;
combining the third shifted data and the fourth shifted data to produce second combined data; and
transmitting the second combined data on a second antenna.

3. The method of claim 2 wherein the step of shifting the data by the third amount comprises the step of cyclically shifting the data by the third amount to produce third cyclically shifted data and wherein the step of shifting the data by the fourth amount comprises the step of cyclically shifting the data by the fourth amount to produce fourth cyclically shifted data.

4. The method of claim 2 further comprising the steps of:
scaling the third shifted data by a third scaling amount to produce third shifted and scaled data;
scaling the fourth shifted data by a fourth scaling amount to produce fourth shifted and scaled data;
and wherein the step combining the third shifted data and the fourth shifted data comprises the step of combining the third shifted and scaled data and the fourth shifted and scaled data to produce the second combined data.

5. The method of claim 1 further comprising the steps of:
scaling the second shifted data by a second scaling amount to produce second shifted and scaled data;
and wherein the step combining the first shifted data and the second shifted data comprises the step of combining the first shifted and scaled data and the second shifted and scaled data to produce the first combined data.

6. The method of claim 1 where the data on a first antenna path comprises time-domain OFDM data.

7. The method of claim 1 where the step of shifting the data by the first amount comprises the step of delaying the data by the first amount.

8. The method of claim 1 further comprising the step of adding a cyclic extension to the first combined data.

9. A method for transmitting data, the method comprising the steps of:
receiving data on a first antenna path;
shifting the data by a first amount on the first antenna path to produce first shifted data;
scaling the first shifted data by a first scaling amount to produce first shifted and scaled data;
shifting the data by a second amount on the first antenna path to produce second shifted data;
scaling the second shifted data by a second scaling amount to produce second shifted and scaled data;
combine the first shifted and scaled data and the second shifted and scaled data to produce first combined data; and
transmitting the first combined data on a first antenna;
wherein the step of shifting the data by the first amount comprises the step of cyclically shifting the data by the first amount to produce first cyclically shifted data and wherein the step of shifting the data by the second amount comprises the step of cyclically shifting the data by the second amount to produce second cyclically shifted data.

10. The method of claim 9 further comprising the steps of:
receiving the data on a second antenna path;
shifting the data by a third amount on the second antenna path to produce third shifted data;
scaling the third shifted data by a third scaling amount to produce third shifted and scaled data;
shifting the data by a fourth amount on the second antenna path to produce fourth shifted data;
scaling the fourth shifted data by a fourth scaling amount to produce fourth shifted and scaled data;
combine the third shifted and scaled data and the fourth shifted and scaled data to produce second combined data; and
transmitting the second combined data on a second antenna.

11. The method of claim 10 wherein the step of shifting the data by the third amount comprises the step of cyclically shifting the data by the third amount to produce third cyclically shifted data and wherein the step of shifting the data by the fourth amount comprises the step of cyclically shifting the data by the fourth amount to produce fourth cyclically shifted data.

12. An apparatus comprising:
a first antenna path receiving data, the first antenna path comprising:
a shift processor shifting and scaling the data by a first amount to produce first shifted and scaled data, the shift processor also shifting the data by a second amount to produce second shifted data, the shift processor also combining the first scaled and shifted data and the second shifted data to produce first combined data;
transmitting circuitry transmitting the first combined data on a first antenna;
a second antenna path receiving data, the second antenna path comprising:
a second shift processor shifting the data by a third amount to produce third shifted data, the second shift processor also shifting the data by a fourth amount to produce fourth shifted data, the shift processor also combining the third shifted data and the fourth shifted data to produce second combined data;

second transmitting circuitry transmitting the second combined data on a second antenna;

wherein the first, second, third, and fourth shifted data comprises first, second, third, and fourth cyclically shifted data, respectively.

13. The apparatus of claim 12 wherein the first shift processor additionally scales the second shifted data by a second scaling amount to produce second shifted and scaled data, and wherein the shift processor also combines the first shifted and scaled data and the second shifted and scaled data to produce the first combined data.

14. The apparatus of claim 13 wherein the data comprises frequency-domain data for a plurality of subcarriers.

15. The apparatus of claim 14 wherein the first shift processor scales the frequency-domain data for the plurality of subcarriers by a first set of FIR-CSD complex numbers on the first antenna path to produce a first scaled frequency-domain data on the plurality of subcarriers.

16. The apparatus of claim 15 wherein the first set of FIR-CSD complex number are given by:

$$a(k + M) = \sum_{m=1}^{n} A_m e^{-j2\pi k D_m / K}$$

where a(k) is the FIR-CSD complex number on subcarrier k, M is the index of the subcarrier at DC, n is the number of cyclic shifts, $A_m$ is a complex scaling factor, $D_m$ is a cyclic shift, $j=\sqrt{-1}$, and K is the length of the Fast Fourier Transform.

17. The apparatus of claim 13 where the shift and scaling amounts are chosen to result in complementary filters in which the first combined data is complementary with the second combined data.

* * * * *